United States Patent

Foucault

[15] 3,693,942

[45] Sept. 26, 1972

[54] MIXING PLANT FOR PREPARING MATERIALS COMPRISING COATED ELEMENTS

[72] Inventor: Pierre Foucault, P.O. 12, Avenue des Vesinet, 78 Croissy-sur-Seine, France

[22] Filed: Aug. 23, 1971

[21] Appl. No.: 174,107

[52] U.S. Cl. ................................................ 259/2
[51] Int. Cl. ............................................ B01f 15/00
[58] Field of Search ........ 259/2, 148, 153, 11, 12, 29, 259/28, 72, 1

[56] References Cited

UNITED STATES PATENTS 2,106,915   2/1938   Martel ........................... 259/2
2,125,046   7/1938   Crandell ......................... 259/2
2,580,854   1/1952   Sherman ......................... 259/2

Primary Examiner—Robert W. Jenkins
Attorney—Charles J. Diller et al.

[57] ABSTRACT

A continuously operated mixing plant for making coated elements, comprising an endless belt passing round end rollers with a substantially horizontal upper run, part of which is formed into a trough by shaping means, and which passes in succession in vertical alignment with a feeder for granulated elements, a binder, a battery of beaters and at least one optional flattening device upstream of a product recuperating device.

10 Claims, 3 Drawing Figures

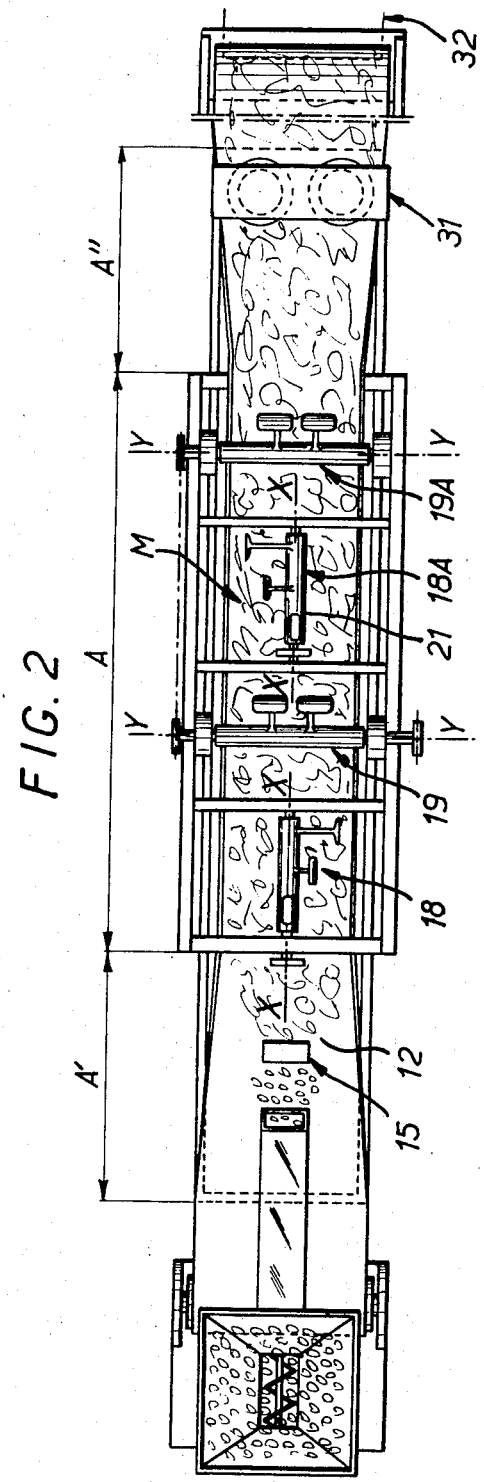
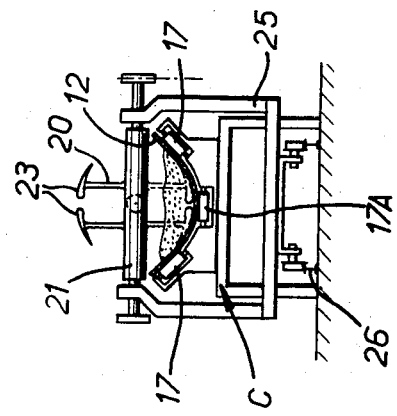
FIG. 2
FIG. 3

3,693,942

MIXING PLANT FOR PREPARING MATERIALS COMPRISING COATED ELEMENTS

BACKGROUND OF THE INVENTION

1. Field of the Invention

This invention relates to a mining plant for the preparation of materials comprising coated elements.

The production of coated complexes is increasing very greatly because of the numerous possible applications with for example concretes for building purposes, coated materials for roadbuilding or for the manufacture of chemical products.

2. Description of the Prior Art

Coated complexes of this kind are generally prepared by introducing all the constituents into a discontinuously operating mixer, and agitating them for a predetermined time.

This procedure does not give full satisfaction because the distribution of the binders or other reagents is uncertain, so that there is a risk of segregation or lumping. Apart from the facts that equipment available at present does not make it possible to obtain products of irreproachable quality, it also does not possess a structure capable of high production rates.

A new technique is being developed which consists in previously preparing the mortar, binder, or reagent and then incorporating this preparation composed of small grains in larger elements, this operation generally being effected discontinuously.

The present invention has the aim of obviating these disadvantages, and for this purpose proposes a mixing plant of simple, robust construction which is particularly easy to use.

SUMMARY

The mixing station according to the invention is characterized in that it comprises essentially an endless belt having a substantially horizontal upper run which is subjected to the action of shaping means in order to form a trough occupying part of this run and passing in succession in vertical alignment with means feeding granulated elements, vertically in line with means feeding at least one binder, vertically in line with a battery of beaters, and vertically in line with at least one flattening device situated upstream of a product recuperation device.

Two groups of beaters are preferably mounted rotatably and are carried on the top part of a frame, which is itself reciprocable in directions parallel to the longitudinal axis of the belt, one of the groups of beaters being rotatable about an axis directed transversely to the belt, while the other group is rotatable in a direction perpendicular to the other direction.

A mixer assembly is thus obtained which mixes together the binder and the granular elements in three directions, which are respectively a longitudinal direction with alternating displacement of the carriage carrying the group of beaters and the simultaneous advance of the belts; a transversal direction with a first group of beaters the axes of rotation of which are parallel to the belt; a vertical direction with the second group of beaters of which the axes of rotation are directed perpendicularly to the previous group. Each group is composed of two beaters, and the beaters disposed following one another are staggered. This arrangement leads to particularly effective mixing of the elements concerned, and this mixing brings about very progressive coating of the granular products, which become charged with binder as they advance together with the belt.

An important advantage of a plant of this kind consists of the fact that the mechanical characteristics of the finished product are very substantially improved in comparison with present similar products.

Another advantage is that production may be interrupted with a minimum of labor, which naturally has repercussions of the cost price.

Yet another advantage of the invention consists of the fact that adjustments during running are possible, thus making it possible to obtain regular and practically instantaneous coating of granular elements of any kind, whether heavy or light, by liquid, plastics, or pulverulent binders, these adjustments making it possible to obtain, as desired, coated complexes within a range in which they may be very generously aerated or else practically solid.

The adjustments may naturally be made in respect of the viscosity of the binder, the flow of the latter and of the granular elements, or else in respect of the speed of advance of the belt, and these adjustments may be made independently or in combination with one another.

BRIEF DESCRIPTION OF THE DRAWINGS

FIG. 2 is a corresponding plan view; and

FIG. 3 is a view in cross-section along the line III—III in FIG. 1.

DESCRIPTION OF THE PREFERRED EMBODIMENT

Figure 1:
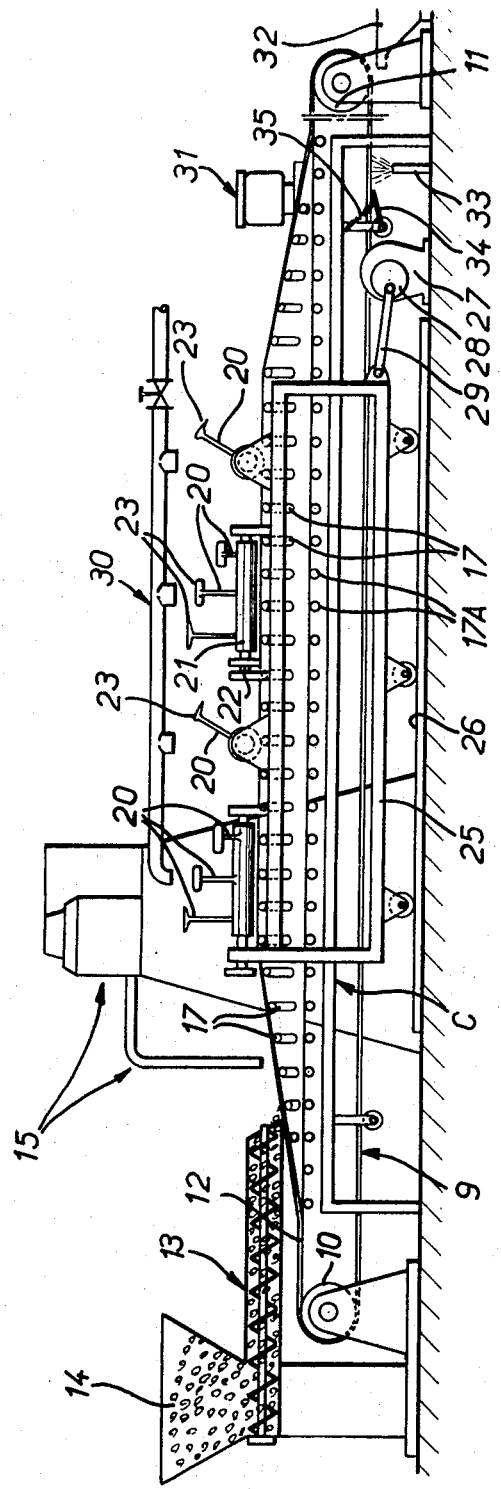
FIG. 1 is a diagrammatical view in longitudinal elevation of the plant.

In the embodiments selected and illustrated in FIGS. 1 to 3, the mixing and coating plant according to the invention comprises essentially an endless belt supported by drums 10 and 11, the horizontal upper run 12 of the belt being disposed at one end under a device indicated generally by 13 for supplying elements 14 of variable granulometry.

Vertically in line with the belt, and downstream of the aforesaid device 13, there is provided a distributor for binder or mortar from an apparatus 15, which advantageously is in conformity with that which formed the object of U.S. Pat. Nos. 1,455,028 and No. 1,498,578 in the name of the applicant.

Over part of its length the upper run 12 of the belt forms a trough which is obtained through the raising of both its edges, as can in particular be clearly seen in FIG. 3. This raising is effected with the aid of lateral rollers 17 so as to form a central portion indicated at "A," which is constituted by the actual trough and on each side of which there is situated an increasing portion "A'" situated upstream of the feed device and a decreasing portion at "A''" downstream of a mixer assembly indicated generally "M," which will now be described in greater detail.

In order to provide it with support the upper run circulates on horizontal rollers 17A mounted rotatably in any suitable manner on a frame indicated diagrammatically at "C."

This mixing device is disposed over the greater part of the trough A and comprises a plurality of beaters 18, 18A and 19, 19A, which are rotatably driven in any suitable manner, which is not illustrated here, being known in itself.

The beaters 18, 18A have their respective axes of rotation $x-x$ directed along the axis of the belt while the axes of rotation $y-y$ of the beaters 19, 19A are directed perpendicularly to the aforesaid axes.

Each of the actual beaters comprises one or more arms 20 fixed to a hub 21 turning on a shaft 22, this arm being shaped at its free end, for example, with a curved tip 23 adapted to provide particularly effective mixing.

It will obviously be understood that the construction illustrated for the arms is in no way given as a limitation, but on the contrary is capable of modification, particularly in dependence on the products treated and the final result desired, and to this end the arms are advantageously fixed removably on the rotating sleeves.

In the example illustrated the battery of beaters is advantageously carried on the top part of a carriage 25, which is adapted to perform reciprocating movements on rails 26 with the aid of a motor 27 with eccentric 28, to which it is coupled by a connecting rod 29.

This arrangement effects particularly complete stirring and mixing of the products because the different elements are movable in three directions, which are: the transverse direction for the group of beaters 18, 18A; vertical for the group of beaters 19, 19A and finally longitudinal for the carriage assembly "C" carrying the beaters.

An additional supply means 30 for binder or other pulverulent product may advantageously be provided above the carriage in order optionally to modify the starting mixture, for example in order to accelerate setting.

Beyond the carriage and the beaters, in the direction of advance of the top run of the belt, a flattener-distributor device is provided which is designated generally 31 and is adapted to distribute the mixed product, concrete or other material over the entire width of the belt, following which at the end of the belt the product is recuperated in any suitable manner at 32 and optionally poured on to an additional belt carrying moulds when it is required to manufacture prefabricated building elements.

Beyond the reception means 32 the bottom run of the conveyor belt is first subjected to washing under pressure, indicated at 33, and then as it continues to advance it is subjected to the action of a scraper 34, advantageously associated with adjustment means 35, after which the belt is clean for a further passage beneath the appliances indicated above.

The invention is obviously not limited to the embodiment selected and illustrated, which is on the contrary capable of modification without thereby departing from the scope of the invention; thus the apparatus described above may be used for mixing pulverulent products with one another or else for mixing pulverulent products with granulated products.

I claim:

1. A continuously operating mixing plant for preparing materials comprising coated elements, said process comprising an endless belt having a substantially horizontal upper run, shaping means to which said upper run is subjected to form a trough in at least part thereof, means for feeding granulated elements, means feeding at least one binder, a battery of beaters, and at least one optional flattening device upstream of a product recuperation device, said upper run of said belt passes in succession in vertical alignment, said means for feeding granulated elements, said means feeding at least one binder, said beaters and said optional flattening device.

2. A continuously operating mixing plant for preparing material comprising coated elements according to claim 1, wherein the assembly of beaters is carried by a frame capable of longitudinal oscillations.

3. A continuously operating mixing plant for preparing materials comprising coated elements, according to claim 1, wherein the battery of beaters is carried by a carriage adapted to move on rails with reciprocating movements along the axis of the belt.

4. A continuously operating mixing plant for preparing elements comprising coated elements, according to claim 1, wherein the battery of beaters is carried by a carriage which is reciprocated by a motor and eccentric.

5. A continuously operating mixing plant for preparing materials comprising coated elements, according to claim 1, wherein the battery of beaters comprises a first group of beaters rotatable on an axis directed transversely in relation to the belt and a second group of beaters rotatable on an axis directed parallel to the axis of the belt.

6. A continuously operating mixing plant for preparing materials comprising coated elements, according to claim 1, wherein each of the beaters comprises a plurality of beating arms having a beak-shaped free end.

7. A continuously operating mixing plant for preparing materials comprising coated elements, according to claim 1, wherein the beaters follow one another and have axes of rotation.

8. A continuously operating mixing plant for preparing materials comprising coated elements, according to claim 1, wherein the trough is formed by the progressive raising of the belt on each side of its longitudinal axis.

9. A continuously operating mixing plant for preparing materials comprising coated elements, according to claim 1, wherein inclined rollers are provided to effect the raising of the belt to form the trough.

10. A continuously operating mixing plant for preparing materials comprising coated elements, according to claim 1, wherein the distributor-flattener device comprises at least one rotatable disc, directed perpendicularly to the belt at a determined distance from the latter.

* * * * *